Figure 1:
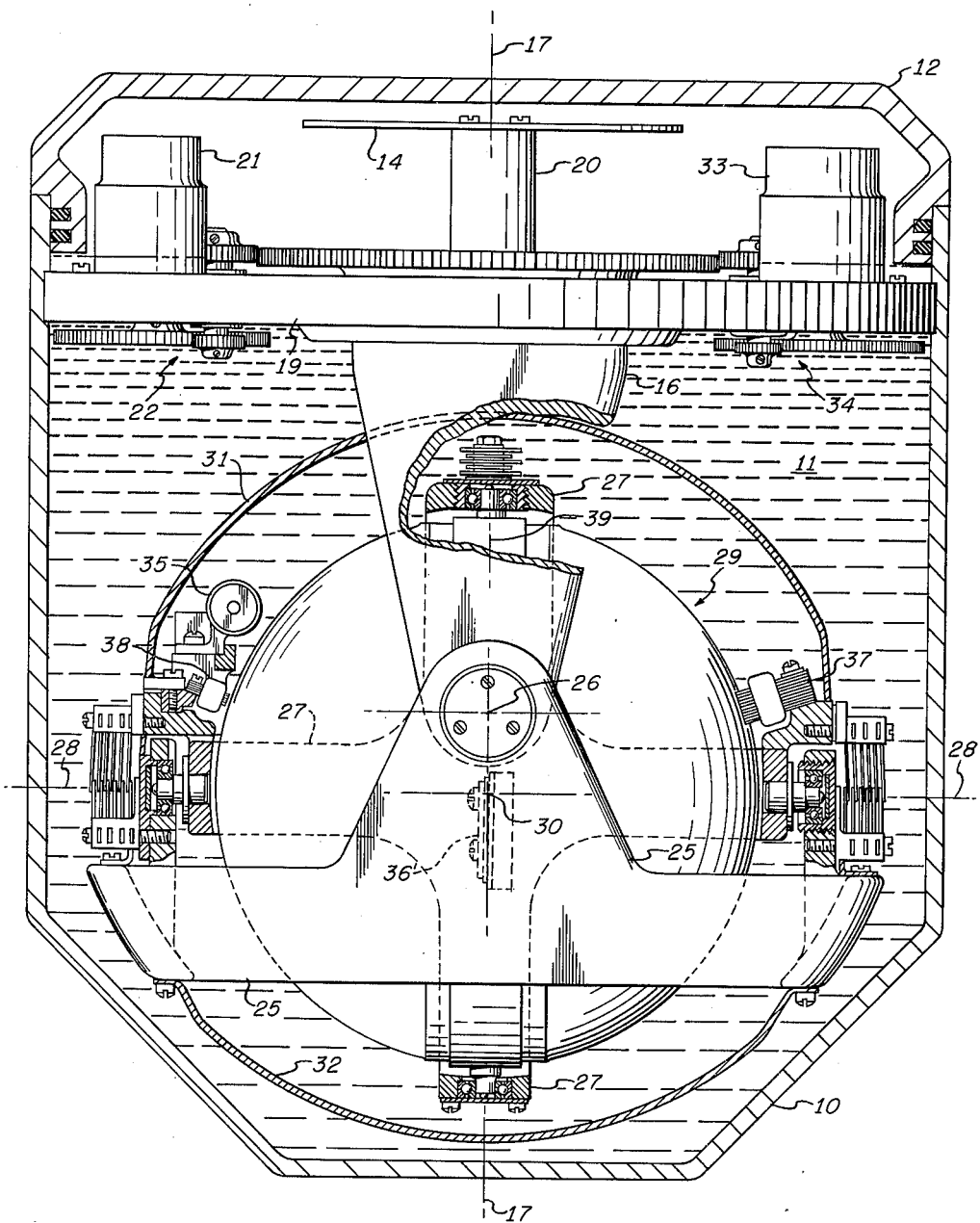

Oct. 19, 1965  L. F. CARTER  3,212,196
GYROCOMPASSES

Filed June 21, 1962  3 Sheets-Sheet 1

INVENTOR
LESLIE F. CARTER (DECEASED)
GRACE C. CARTER (EXECUTRIX)
BY
Arthur H. Serrell
ATTORNEY Oct. 19, 1965 L. F. CARTER 3,212,196
GYROCOMPASSES
Filed June 21, 1962 3 Sheets-Sheet 2

INVENTOR
LESLIE F. CARTER (DECEASED)
GRACE C. CARTER (EXECUTRIX)
BY
Arthur H. Serrell
ATTORNEY Oct. 19, 1965  L. F. CARTER  3,212,196
GYROCOMPASSES Filed June 21, 1962  3 Sheets-Sheet 3

INVENTOR
LESLIE F. CARTER (DECEASED)
GRACE C. CARTER (EXECUTRIX)
BY
Arthur H. Serrell
ATTORNEY

United States Patent Office 3,212,196
Patented Oct. 19, 1965

3,212,196
GYROCOMPASSES
Leslie F. Carter, deceased, late of Leonia, N.J., by Grace C. Carter, executrix, Leonia, N.J., assignor to Sperry Rand Corporation, Great Neck, N.Y., a corporation of Delaware
Filed June 21, 1962, Ser. No. 204,200
5 Claims. (Cl. 33—226)

This invention relates to a gyrocompass of the reverse gimbal type having a miniature binnacle and relatively sized cooperative components particularly adapted for use within the space limitations of a small marine craft such as a P.T. boat or land vehicle such as a tank. FIG. 4 of the drawing of U.S. Patent No. 2,692,441 shows a gyrocompass structure of the character specified in which gimbal 24 is the reverse gimbal. In the specified type of gyrocompass, the reverse gimbal is the gimbal connected to the directive element with its major axis normally horizontal rather than vertical and its minor axis normally vertical rather than horizontal.

The primary object of the present invention is to reduce the size as well as the cost of instruments of this character by eliminating internal binnacle components such as the phantom ring, the horizontal gimbaling and shock mount structure supporting both the phantom ring and directive element within the binnacle, and the structure individually supporting both the phantom ring and directive element with freedom about a vertical axis. The modified instrument provides reliable heading information although subject to the disturbing environmental influences of vibration and shock in the frame of the craft, and the magnetic fields of nearby field sources as well as other external magnetic field sources.

One of the features of the present invention is provided by a follow-up compass yoke or member as a component of the instrument that is operatively connected to a drive motor directly mounted on the binnacle.

Another feature of the invention resides in the gimbal structure mounting provided in the improved instrument for the directive element which includes a pendulous gimbal that is connected to the follow-up yoke with freedom about a North-South axis and a reverse gimbal that is mounted on the pendulous gimbal with an East-West axis that is below the axis of the pendulous gimbal. By means of the improved gimbal system with the pendulous gimbal and the reverse gimbal, the directive element of the instrument is mounted on the binnacle with the element pendulously conditioned in relation to its North-South axis and mounted in neutral equilibrium in relation to its East-West axis.

A further feature resides in the structure of the binnacle per se to provide a reservoir for a fluid having both lubricating and damping characteristics to provide lubrication for the bearings between the binnacle and compass yoke, the compass yoke and pendulous gimbal, the pendulous gimbal and reverse gimbal and the reverse gimbal and element and damping for the pendulous gimbal.

Still another feature of the invention is provided by the top and bottom hemispherical shells connected to the pendulous gimbal as a baffle for the fluid between the directive element and yoke and between the directive element and the binnacle.

Figure 2:
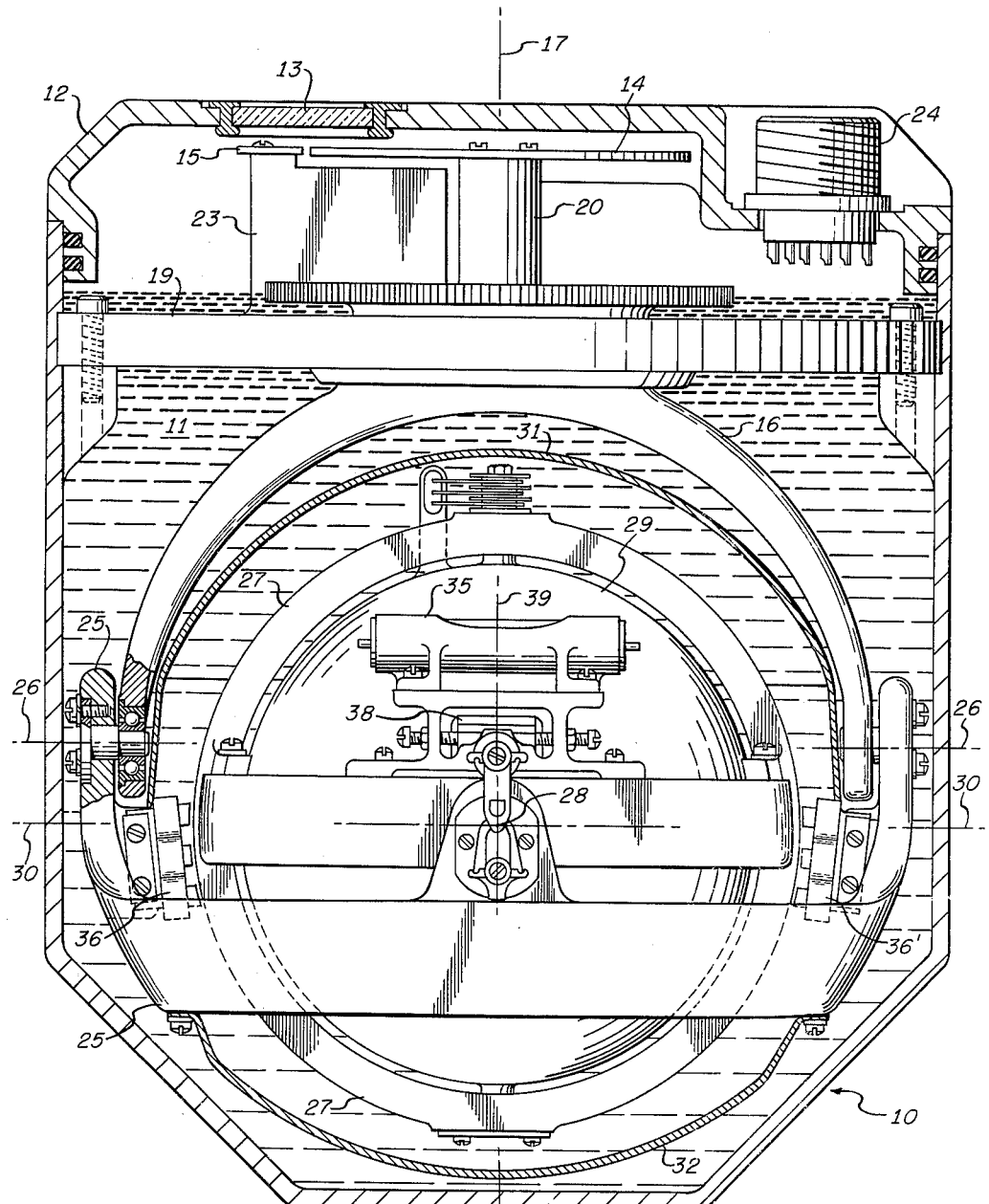
Figure 3:
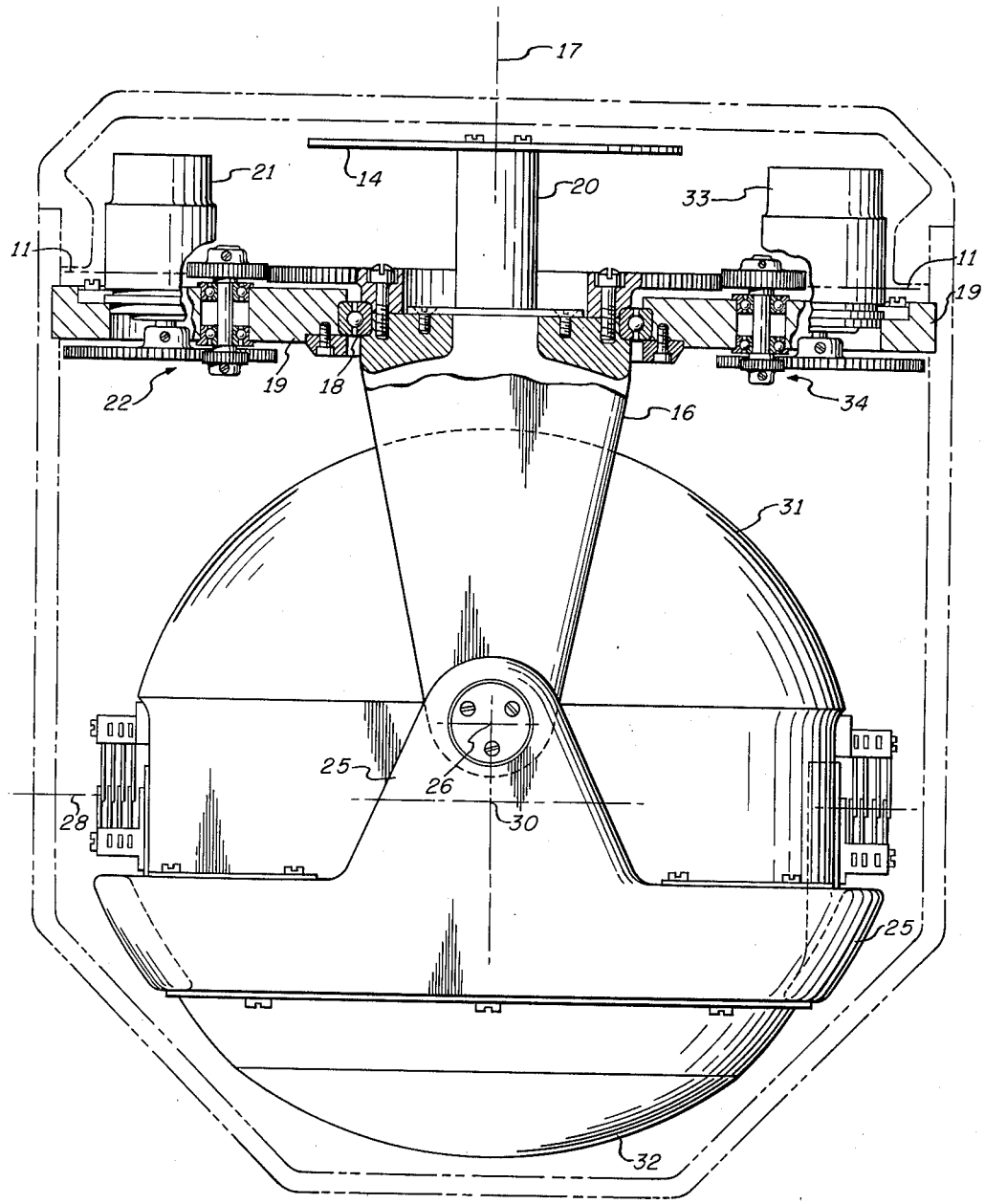

Other objects, features and structural details of the invention will be apparent from the following description when read in relation to the accompanying drawings wherein, FIG. 1 is an East-West elevation view of the improved gyrocompass with some of the components being shown in cross section, FIG. 2 is a North-South elevation view of the instrument shown in FIG. 1 with the components also shown in partial cross section, and FIG. 3 is a view similar to FIG. 1, showing the shell structure on the pendulous gimbal providing the baffle for the fluid between the directive element and yoke and between the directive element and binnacle.

As shown in the drawings, the improved gyrocompass includes a binnacle 10 of miniature size that provides a reservoir for a fluid 11 such as a suitable light oil having both lubricating and damping characteristics. The binnacle 10 is mounted on the craft on which it is used with the level of the fluid 11 above that of the relatively movable cooperating components of the compass. The fluid accordingly provides shock and vibration protection as well as protection from humidity and dirt for the cooperating components within the binnacle that are immersed therein. The fluid also provides lubrication for the bearings of the gimbal system connecting the movable components as well as damping for the pendulous gimbal hereinafter described. The temperature that the instrument is operated at is maintained within a narrow range by conventional thermostat and heater controls (not shown) for the fluid. As shown, the binnacle 10 includes a cover 12 having a window 13 therein, FIG. 2, through which the heading of the craft is observed by the human pilot by a comparison of the relative positions of a compass card 14 and a fixed plate 15 with a lubber line thereon.

The directive element of the improved gyrocompass is directly supported within the binnacle 10 by a gimbaling system which includes a compass yoke or follow-up ring 16 mounted with freedom about a vertical axis 17 through a bearing connection 18 to a suitable mounting plate 19 fixed to the binnacle. There are no intermediate gimbals such as indicated at 2 and 4 in FIG. 1 of the drawing of the U.S. Patent 2,692,441 between the follow-up member and the craft. The patented gyrocompass of Carter is pendulous universally with respect to a point of suspension defined by the intersections of the axes of the gimbals 2 and 4. In the improved gyrocompass, ring or yoke 16 tilts with the craft as the craft tilts about both its pitch and roll axes. The card 14 of the improved instrument is shown as fixedly mounted on the top of an axially extending portion 20 of the yoke 16. The means for driving the yoke 16 and compass card 14 about the vertical axis 17 is provided in the improved instrument by a follow-up motor 21 that is fixedly connected to mounting plate 19 and operatively connected to the yoke through reduction gearing as indicated at 22 in FIG. 1. As shown in FIG. 2, the fixed lubber line plate 15 of the compass is connected to the binnacle mounting plate 19 through a suitable bracket fastening 23. The binnacle cover 12 further includes an electrical plug 24 attached thereto, FIG. 2, through which the energy required to spin the gyroscopic rotor as well as to energize the meridian seeking, damping and follow-up controls is supplied. The fluid 11 provides lubrication for the bearing 18 between the binnacle 10 and yoke 16 as well as the gearing 22 between the shaft of motor 21 and the yoke 16. In the improved instrument, the yoke 16 supports the directive element and also moves with operation of motor 21 to position the compass card 14 in relation to the lubber line plate 15 about the axis 17.

To provide stabilization for the directive element with respect to the craft about a North-South directed axis only in the improved instrument, the gimbal mounting system further includes a pendulous gimbal 25 that is connected to yoke 16 with freedom about a North-South gimbal axis 26. The bearings connecting the yoke 16 and gimbal 25 are lubricated by the fluid 11. The oscillations of the gimbal 25 in relation to the axis 26 are also damped by the fluid 11.

The reverse gimbal 27 of the mounting system is connected to the pendulous gimbal 25 with freedom about an East-West axis 28 that is below the North-South axis of gimbal 25. This axis is the horizontal major axis of the reverse gimbal 27. The fluid 11 lubricates the bearings between the pendulous gimbal 25 and the East-West gimbal 27.

The directive element of the improved compass as generally indicated at 29 is a hermetically sealed, spherical rotor case component with a single gyroscopic rotor of the type shown in U.S. Letters Patent No. 2,886,897, issued May 19, 1959, to Lennox F. Beach for Zenith Meridian Indicators. The case is a spherical shell that is preferably evacuated and partially filled with helium within which a gyroscopic rotor is driven by an electric motor to spin about a North-South axis indicated at 30 in FIG. 2. The fluid 11 encircles the directive element 29 whose center of gravity coincides with its geometrical center which is located as indicated in the drawings at the intersection of the North-South axis 30 of the directive element 29 and the East-West axis 28 of the reverse gimbal 27 of the instrument. The gimballing described accordingly mounts the directive element on the binnacle 10 pendulously conditioned in relation to its North-South axis 30 and in neutral equilibrium in relation to its East-West axis 28. The pendulous condition is provided by the gimbal 25 and gimbal 27 in locating the center of gravity of element 29 along North-South axis 30 below that of the North-South gimbal axis 26. The neutral equilibrium condition is provided by constructionally locating the center of gravity of the directive element 29 on the East-West gimbal axis 28. From another viewpoint, the axis 26 of the pendulous gimbal 25 is above the spinning axis 30 of the rotor of the directive element 29, the axis 30 being in a horizontal plane that includes the East-West axis 28 of the gimbal 27. The spherical case of the directive element 29 is also mounted on the reverse gimbal 27 with freedom about a vertical axis 39 that in the provided arrangement, as shown in FIGS. 1 and 2, normally coincides with the axis 17 of the compass yoke 16. The axis 39 is the vertical minor axis of the reverse gimbal 27. The bearing connections between the element 29 and reverse gimbal 27 are also lubricated by the fluid 11. The immersed gimbal components and directive element are constructed of such volume and material as to substantially correspond in density to the density of the displaced fluid 11 at the operating temperature of the instrument. Accordingly, the movable components are buoyantly supported by the fluid 11 in a manner relieving the weight loading on the respective bearings of the compass between the element 29 and binnacle 10.

As particularly shown in FIG. 3, the pendulous gimbal 25 of the improved compass includes top and bottom hemispherical shells respectively indicated at 31 and 32. The shells 31 and 32 together with gimbal 25 provide respective baffles for the fluid 11 between the element 29 and yoke 16 and between element 29 and binnacle 10 that protects the element from fluid motion external to the baffle structure as the binnacle and yoke move about axis 17 either together or independently.

Conventional gyrocompass elements shown in the drawing include a data transmitter 33, FIG. 1, located on mounting plate 19 and operatively connected to the compass yoke or member 16 through reduction gearing 34, FIG. 3. The meridian seeking, damping and follow-up motor 21 controls provided for the improved compass are of the character shown in U.S. Letters Patent No. 2,729,108, issued January 3, 1956, to V. Vacquier et al., for Control Systems for Gyroscopic Instruments. In accordance with the patented control system noted, a suitable tilt sensor or electrolytic level 35 mounted on reverse gimbal 27 provides an electrical output through a narrow tilt range in accordance with the tilt of the gimbal 27 about the neutral East-West axis 28 of the directive element 29. In the meridian seeking channel of the system, this output is utilized to operate torquing means effective about the East-West horizontal axis 28 shown in FIG. 2 as torque motors 36, 36' located on gimbal 25 to act on gimbal 27. In operation, the torque exerted about axis 28 by the motors 36, 36' is effective to maintain the spin axis of the rotor of the directive element 29 on the meridian. This axis is designated in the drawing as the North-South axis 30 of the directive element 29. In the damping channel of the system, the output of the sensor or electrolytic level 35 is utilized to energize a motor 37, FIG. 1, mounted on gimbal 27, FIG. 1, that exerts a torque about the vertical axis 39 of the directive element 29 in relation to the reverse gimbal 27. This torque is exerted in a direction that precesses the reverse gimbal 27 toward a level condition about its East-West tilt axis 28. The period of the instrument depends on the apportionment of the output of the level 35 between the respective directive and levelling channels as well as on the latitude of the craft. The card 14 in the improved instrument is positioned in accordance with the North-South directive element 29 through movement of the yoke 16 about axis 17 by the follow-up motor 21 that is operated by the output of an electrical pick-off 38, FIG. 1, located on the reverse gimbal 27. The output of the pickoff 38 is dependent on relative movement between the directive element 29 and reverse gimbal 27 about the vertical axis 39 of the element 29.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a gyrocompass of the reverse gimbal type, a binnacle, a follow-up member mounted on the binnacle with freedom about a normally vertical axis; a directive element with an East-West axis, a normally vertical axis and a gyroscopic rotor spinning about a North-South axis; a sensor having an output depending on the tilt of the element about its East-West axis, means responsive to the output of the sensor for exerting a meridian seeking torque about the East-West axis of the element, means responsive to the output of the sensor for exerting a damping torque about the vertical axis of the element; and means for connecting the element and member with the element and sensor in pendulous condition about a North-South axis above and parallel to the rotor axis and in neutral equilibrium with respect to the East-West axis including a pendulous gimbal mounted on the member with freedom about the axis above and parallel to the rotor axis and a reverse gimbal connected to the pendulous gimbal at the East-West tilt axis of the element and connected to the element at the vertical axis of the element.

2. A combination of the character claimed in claim 1 in which the binnacle is fluid tight, the member is a yoke, and the sensor is an electrolytic level, including a follow-up motor mounted on the binnacle operatively connected to the yoke, a pick-off having a part fixed to the reverse gimbal and a part fixed to the element operatively connected to the follow-up motor, and a lubricating and damping fluid in the binnacle in which the yoke, the directive element, the level, the gimbals, the torque exerting means and the pick-off are immersed.

3. A combination of the character claimed in claim 2 in which the pendulous gimbal includes two hemispherical shells, one of which provides a fluid baffle between the yoke and element, and the other of which provides a fluid baffle between the element and binnacle.

4. A gyrocompass of the reverse gimbal type including a fluid tight binnacle, a compass yoke mounted on the binnacle with freedom about a normally vertical axis; a directive element with an East-West axis, a normally vertical axis and a gyroscopic rotor spinning about a North-South axis; an electrolytic level having an output depending on the tilt of the element about its East-West axis, means responsive to the output of the level for exerting a meridian seeking torque about the East-West axis of the element, means responsive to the output of the level for exerting a damping torque about the vertical axis of the element; means for connecting the element and yoke, with the element and level in pendulous condition about a North-South axis above and parallel to the rotor axis and in neutral equilibrium with respect to the East-West axis including a pendulous gimbal mounted on the yoke with freedom about the axis above and parallel to the rotor axis, and a reverse gimbal connected to the pendulous gimbal at the East-West tilt axis of the element and connected to the element at the vertical axis of the element; a pick-off having an output with relative movement between the element and reverse gimbal about said vertical axis, a follow-up motor mounted on the binnacle operatively connected to the compass yoke responsive to the output of the pick-off, and a lubricating and damping fluid in the binnacle in which the yoke, the directive element, the level, the gimbals, the pick-off and the torque exerting means are immersed.

5. A gyrocompass of the character claimed in claim 4, in which the pendulous gimbal is a part of a fluid baffle between the element and binnacle that includes a first hemispherical shell mounted on the pendulous gimbal between the yoke and element in immersed condition in the fluid, and a second hemispherical shell mounted on the pendulous gimbal between the element and binnacle in immersed condition in the fluid.

References Cited by the Examiner
UNITED STATES PATENTS

| | | | |
|---|---|---|---|
| 1,628,136 | 5/27 | Ford | 33—226 |
| 1,925,138 | 9/33 | Dillman | 33—226 |
| 2,677,194 | 5/54 | Bishop | 33—226 |
| 2,692,441 | 10/54 | Carter | 33—226 |
| 2,713,270 | 7/55 | Jewell | 33—226 X |
| 2,729,108 | 1/56 | Vacquier et al. | 33—226 X |
| 2,854,850 | 10/58 | Braddon. | |
| 2,970,382 | 2/61 | Notomi | 33—226 |

FOREIGN PATENTS 584,486  10/59  Canada.

ROBERT B. HULL, *Primary Examiner.*